(12) United States Patent
Ducros

(10) Patent No.: US 6,688,167 B2
(45) Date of Patent: Feb. 10, 2004

(54) MEASURING THE PROFILE OF A PAVEMENT BY MOVING THREE CONTACTLESS DISTANCE-MEASURING SENSORS

(75) Inventor: Daniel-Marc Ducros, Nantes (FR)

(73) Assignee: Laboratoire Centrao des Ponts et Chaussees, Paris (FR)

( * ) Notice: Subject to any disclaimer, the term of this patent is extended or adjusted under 35 U.S.C. 154(b) by 0 days.

(21) Appl. No.: 10/149,927

(22) PCT Filed: Dec. 15, 2000

(86) PCT No.: PCT/FR00/03555

§ 371 (c)(1),
(2), (4) Date: Jun. 13, 2002

(87) PCT Pub. No.: WO01/44754

PCT Pub. Date: Jun. 21, 2001

(65) Prior Publication Data

US 2003/0000097 A1 Jan. 2, 2003

(30) Foreign Application Priority Data

Dec. 17, 1999 (FR) .............................................. 99 15954

(51) Int. Cl.⁷ .............................................. G01M 17/02
(52) U.S. Cl. .............................. 73/146; 73/104; 73/105
(58) Field of Search ........................... 73/146, 104, 105

(56) References Cited

U.S. PATENT DOCUMENTS

| | | | | |
|---|---|---|---|---|
| 4,422,322 A | * | 12/1983 | Sprangler | 73/105 |
| 4,571,695 A | | 2/1986 | Elton et al. | 364/550 |
| 5,065,618 A | | 11/1991 | Hodges, Sr. et al. | 73/146 |
| 5,280,719 A | | 1/1994 | Noss | 73/146 |
| 5,614,670 A | * | 3/1997 | Nazarian et al. | 73/146 |
| 5,753,808 A | | 5/1998 | Johnson | 73/146 |

* cited by examiner

Primary Examiner—Edward Lefkowitz
Assistant Examiner—Alandra Ellington
(74) Attorney, Agent, or Firm—James Ray & Associates

(57) ABSTRACT

Reconstituting the profile of a pavement consists of moving three contactless distance-measuring sensors over a pavement, the sensors being equidistant and in horizontal alignment in the direction of motion. The sensors deliver signals representative of their respective heights above the pavement. Measuring the distance traveled by the sensors, and measuring twice the height measured by the middle sensor from the sum of the heights of the two end sensors. The apparatus has a horizontal beam fitted with three sensors, a device for measuring the distance traveled, and a computer, the assembly being mounted on a load-carrying chassis or vehicle.

3 Claims, 2 Drawing Sheets

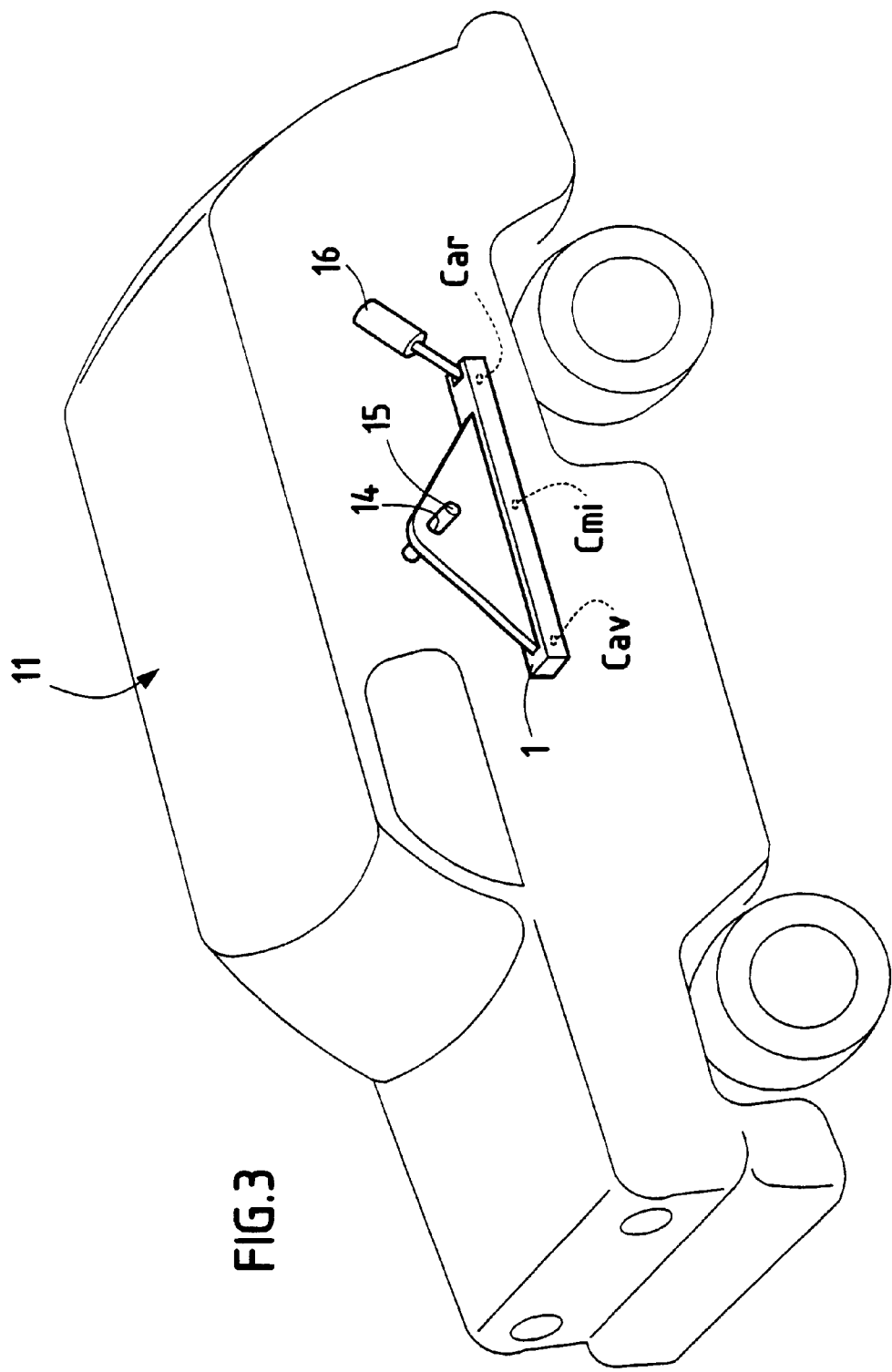

MEASURING THE PROFILE OF A PAVEMENT BY MOVING THREE CONTACTLESS DISTANCE-MEASURING SENSORS

FIELD OF THE INVENTION

The present invention relates to the field of measuring departures from planeness in the surfaces of road and highway pavements, and of all paths on which vehicles of any type travel, including runways.

BACKGROUND OF THE INVENTION

Departures from planeness in road or highway pavements, in traffic paths of all types, and in runways, give rise to significant drawbacks for users and also for the works themselves. For users, numerous studies have shown that the comfort, safety, and costs of using vehicles are influenced to a very great extent by the vibrations induced by departures from planeness. So far as the works themselves are concerned, these defects give rise to additional stresses which shorten their lifetime.

As a result, regulations require minimum quality standards to be satisfied when the works are constructed, both for satisfying users and for ensuring long life for the work. An evaluation of the planeness qualities of a work is also one of the major parameters used during periodic inspections thereof for maintenance purposes.

The advantage of having means for measuring departures from planeness is therefore manifest, both for contractors and for authorities.

In conventional road terminology, it is the practice to use the terms "profile" and "departures from profile" rather than "departures from planeness", and apparatus capable of providing an image of the real profile of the road surface by sampling along one or more substantially parallel lines in a given direction, and capable of being included in ordinary traffic, is referred to as a "dynamic" profilometer, as contrasted with "static" profilometers which require the road under test to be closed to traffic.

It should be observed that all existing profilometers give an image that approximates to the real profile, firstly because they do not observe the entire surface but only a finite number of lines, and secondly because they filter the real profile, deforming it both in amplitude and in phase within wavelength bands where their response differs from unity, and generally in phase even in frequency bands where their amplitude response is indeed unity.

So far as roads are concerned, the following are generally distinguished:

- microtexture for wavelengths shorter than 0.5 millimeters (mm);
- macrotexture for wavelengths lying in the range 0.5 mm to 50 mm;
- megatexture for wavelengths lying in the range 50 mm to 0.5 meters (m); and
- smoothness (or conversely roughness) for wavelengths lying in the range 0.5 m to 50 m.

Present dynamic profilometers can be classified in two broad categories:

- profilometers using an inertial reference making use of an inertial type artificial horizon as a reference plane, and measuring variations in height relative to said reference plane in order to estimate profile; by construction such devices are sensitive to measurement speed and to the quality of their reference plane; and
- profilometers using a pure geometrical reference, which starting from a known position enable profile to be reconstructed by moving a ruler with precision; by construction, these devices are sensitive to the precision with which the ruler is moved and also to measurement errors, where the influence of such errors generally increases exponentially with distance.

The state of the art is illustrated by document WO 98/24977 published on Jun. 11, 1998 which shows a profilometer on board a vehicle, the profilometer having three contactless distance-measuring sensors mounted at the front of the vehicle chassis and aligned transversely in a direction perpendicular to the travel direction of the vehicle, together with a system for measuring the positions of the sensors relative to an artificial horizon, said system comprising in particular an accelerometer for measuring vertical acceleration and inclinometers for measuring the inclinations of the chassis relative to the artificial horizon, both in terms of roll and in terms of pitch. Each sensor provides a measurement of its height above the pavement. By using a computer that is connected to the various devices, that profilometer makes it possible to reconstruct the profile along three lines drawn along the pavement, one line to the right of the vehicle, one line to the left of the vehicle, and a central line.

U.S. Pat. No. 4,571,695 describes a device whose intended purpose is to measure the smoothness of a pavement, i.e. its deformation in the absence of any load relative to an ideal surface, and it also seeks to measure pavement deflection, i.e. deformation under the effect of a load relative to its state in the absence of load.

Given the principle on which it works, the device described in U.S. Pat. No. 4,571,695 requires four sensors referenced 10, 20, 30, and 40 in its FIGS. 1 and 2. That document describes measuring smoothness with the help of a memory system, requiring extreme accuracy in the positioning of one measurement relative to another. The term "memory system" is used to designate a measurement system in which the value of measurement n depends on the value of measurement k where k<n. Such systems present at least two particular features: firstly, any error in measurement k induces an error in measurement n and entrains error propagation, and secondly it is generally necessary to make assumptions about the first measurement or to apply a posteriori corrections on the set of measurements, even if they do not include any error, in order to compensate for the lack of any antecedents for the first measurement. Thus, in the measurement method described in U.S. Pat. No. 4,571,695, the height of each measurement point is a function of previously measured points and the pitch at which measurement points are sampled is determined by the relative position of the various sensors along the beam which they use as a support.

The present invention thus seeks to provide a method of reconstituting the profile of a line drawn on a pavement that makes it possible to ignore the oscillations of the support for the measuring devices (body movements if the support is a road vehicle), variations in speed, speeds of the support, and problems of phase, of the influence of the shape of support beam on the sampling pitch, and of the need to use the preceding points in order to calculate the current point.

SUMMARY OF THE INVENTION

The method of the invention is characterized by:

moving over the pavement three contactless distance-measuring sensors that are equidistantly in horizontal alignment in the direction of motion;

simultaneously measuring the height of each of the three sensors above the pavement;

measuring the distance travelled by one of said sensors; and substracting twice the height measured by the middle sensor from the sum of the heights measured by the end sensors.

It can be shown by calculation that the result of the subtraction is proportional to the function that represents the profile, and that it is independent of the position of the artificial horizon used in conventional methods of calculation. This is shown below in the present specification. In addition, the coefficient of proportionality does not include a phase term. As a result, if a direct Fourier transform is applied to the signal representative of the result of the subtraction, and if a simple multiplying coefficient is applied to the real and imaginary portions of the transform, then the initial profile can be obtained by performing the inverse Fourier transform.

The three contactless measurement sensors preferably pick up the distance between themselves and the pavement simultaneously. This operation is repeated each time the sensors have travelled through a selected distance. This distance is fixed for any one series of measurements.

The travel distance pitch is fixed for a series of measurements corresponding to a sample or to a portion of the pavement, but this travel distance pitch can be modified at will. It can be made longer when it is desired to measure the smoothness or the megastructure of the pavement, or shorter when it is desired to measure the microtexture or the macrotexture of certain lengths of the pavement.

The contactless distance-measuring sensors are preferably of the laser type using a triangulation principle or a method based on defocusing, as explained in EP 0 278 269. It is also possible to envisage using ultrasound sensors operating at high frequency or conventional telemetry devices of precision enabling resolution of about 10 microns to be obtained.

The invention also provides apparatus for implementing the method.

The apparatus is characterized by the fact that it comprises:

a carrying vehicle suitable for being moved along the pavement;

a longitudinal beam carried by said vehicle in such a manner as to be substantially horizontal;

three contactless distance-measuring sensors that are mounted equidistantly in horizontal alignment on said beam and that are suitable for delivering signals representative of their heights above the pavement;

a device for measuring the distance travelled by the vehicle; and a computer receiving signals from the device for measuring the distance travelled by the vehicle and from the contactless distance-measuring sensors.

Because of the principle on which calculation is based, the proposed apparatus does not introduce any phase distortion in profile measurement. As a result it enables the true profile to be reconstituted easily by using simple signal processing methods.

The proposed apparatus does not use an inertial reference. It can thus easily be used in traffic at varying speed, e.g. in an urban area, without that affecting the result of the measurements taken.

The proposed apparatus is not of the type having a pure geometrical reference. It is thus less sensitive to measurement errors and less demanding concerning the quality of the distance reference used.

Since the proposed apparatus uses contactless sensors and delivers results that are independent of the movements of its carrying apparatus, it can be used during the operations of building the structures mentioned in the introduction.

The proposed apparatus is equally suitable for dynamically measuring smoothness and megatexture, or alternatively statically measuring microtexture and macrotexture.

It should be observed that the carrying vehicle can be the chassis of a conventional road vehicle.

DESCRIPTION OF THE DRAWINGS

Other advantages and characteristics of the invention appear on reading the following description given by way of example and made with reference to the accompanying drawings, in which:

FIG. 3 shows a vehicle fitted with the FIG. 2 profilometer.

DESCRIPTION OF THE PREFERRED EMBODIMENT

Figure 2:
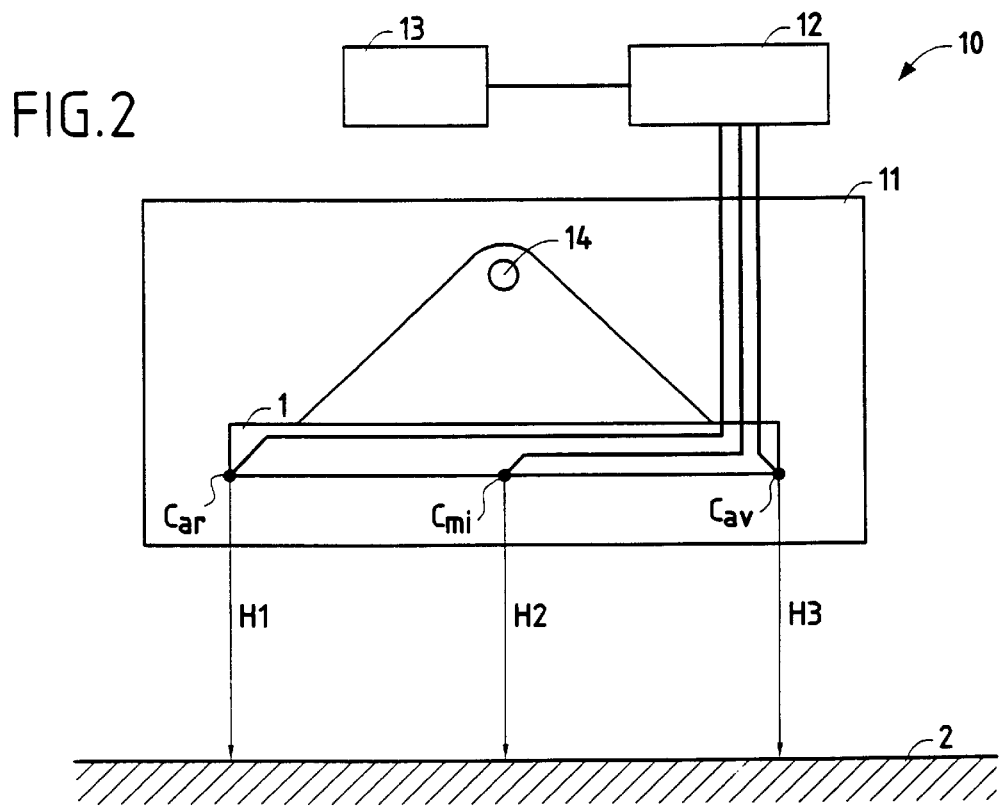
FIG. 2 is a diagram of the profilometer implementing the method of the invention.

FIG. 2 shows a horizontal beam 1 which is moved in the direction x defined by the axis of the beam over a pavement 2 which includes departures from planeness, the beam being at a mean height H from the pavement.

Three contactless distance-measuring sensors are mounted on the beam 1 and are referenced from the front to the rear of the beam 1 as follows: $C_{av}$, $C_{mi}$, and $C_{ar}$. Each of the front and rear sensors $C_{av}$ and $C_{ar}$ is placed at a distance L from the middle sensor $C_{mi}$. The length of the beam 1 is thus at least 2L.

In conventional manner, each sensor $C_{av}$, $C_{mi}$, and $C_{ar}$ preferably comprises a device for transmitting signals towards the pavement 2, a device for receiving the echo reflected by the pavement 2, a device for measuring the time interval between signal transmission and echo reception, and a device for computing the height of the transmitter above the pavement 2. An example of a sensor of this type is described in EP 0 278 269.

Figure 1:
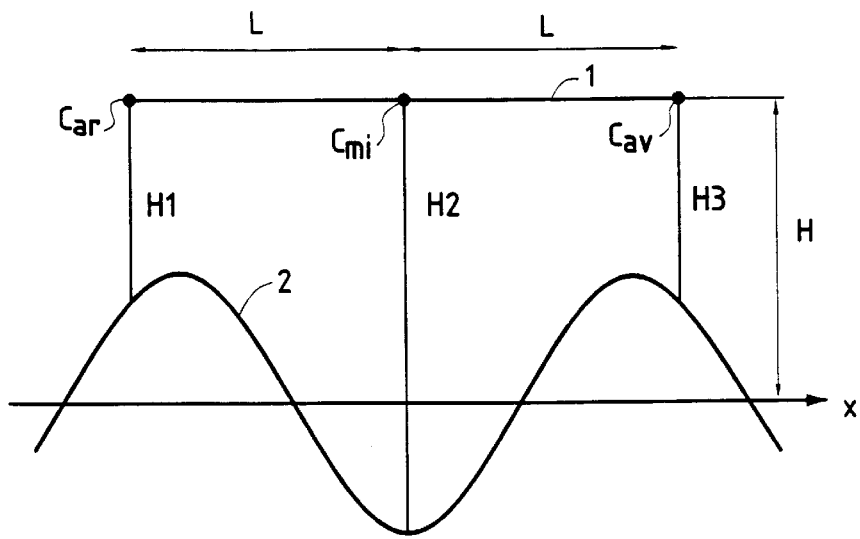
FIG. 1 shows the general principle on which the calculation method of the invention is based.

Let the profile of the pavement (FIG. 1) be a sinewave of equation g(x), where x is the abscissa value for the middle sensor $C_{mi}$.

Let $\lambda$ be the wavelength of the sinewave g(x), thus:

$$g(x) = \sin(2\pi x/\lambda)$$

Let H1, H2, and H3 be the respective heights of the sensors $C_{ar}$, $C_{mi}$, and $C_{av}$ above the pavement.
Then:

$$H1 = H - (\sin(2\pi x - L)/\lambda)$$

$$H2 = H - (\sin(2\pi x/\lambda)$$

$$H3 = H - (\sin(2\pi x + L)\lambda)$$

Writing A=H1+H3−2H2, then:

$$A = 2 \sin(2\pi x/\lambda)(1 - \cos(2\pi x/\lambda))$$

$$A = 2(1 - \cos(2\pi x/\lambda))g(x)$$

Ignoring a weighting coefficient, the equation for A is the equation of the function g(x).

It is important to observe that the coefficient does not include any phase term. As a result, if a direct Fourier transform is applied to the signal A, and if a simple multiplying coefficient is applied to the real and imaginary portions of the transform, then the initial profile can be obtained by performing the inverse Fourier transform.

If space sampling is performed at a pitch P, and if a direct Fourier transform is performed on N samples, then point i of the transform is associated with spatial frequency:

$$f(i) = i/NP$$

however $$f(i)=1/\lambda$$

so the multiplying coefficient is given by:

$$k(i)=1/(2-2\cos(2\pi L\, i/NP))$$

In the above, it should be observed that the travel speed of the beam does not appear. The method is therefore independent of speed, which makes it possible to apply the method to a profilometer carried by a vehicle which can be included in any traffic flow.

In the equation for A, the height H of the beam 1 above the pavement does not appear.

In the method, the beam 1 can be moved vertically without that harming the results obtained. It suffices that the beam 1 remains in a horizontal position.

During measurements, the three sensors $C_{av}$, $C_{mi}$, and $C_{ar}$ are controlled by a computer so as to pick up simultaneously the distance between each of them and the pavement.

To reconstitute the profile of a pavement 2, a point of origin is determined form the abscissa x, the distance x travelled by the middle sensor $C_{mi}$ is measured by means of a known device, e.g. a pedometer, and the distance travelled is subdivided into segments of pavement. In each segment of pavement, N measurements of the height H1, H2, and H3 are performed with sampling at a fixed pitch P, and for each measurement, the value of A is calculated.

When N measurements have been performed, the profile of the corresponding segment is reconstituted by means of a computer and signal-processing programs.

The pitch P is a constant for a given segment, i.e. for N samples. However the pitch P can be modified when changing pavement segment.

The weighting coefficient which is the inverse of the multiplying coefficient k(i) becomes zero if L is a multiple of $\lambda$. It is therefore impossible, in theory, to see wavelengths k that are integer submultiples of L. However, this problem is of no importance, since if spatial sampling is used, then the weighting coefficients become zero when L=k NP/i, k being an integer. It thus suffices in theory to give L a value that is irrational in order to avoid the problem. In practice, it suffices to give L a length that is sufficiently short compared with the wavelengths under investigation to avoid meeting the problem.

The weighting coefficient decreases with $\lambda$, once $\lambda$ is greater than 2L. For $\lambda$=100 L, the weighting coefficient is equal to 0.004, i.e. if it is desired to measure millimeter distances, then it is necessary to have sensors capable of measuring micron distances. In practice, this constraint is weaker that it appears insofar as the method is intended for measuring road profiles, having spectral characteristics that are such that amplitudes corresponding to long wavelengths are much greater and do not require accuracy of millimeter order. Nevertheless, it is clear that at this level the method departs from the real profile, however the distortion relative thereto is compression of amplitudes which is less troublesome, for interpretation purposes, than is phase distortion.

The calculations performed above show that the mean height H of the beam 1 above the pavement has no influence on the measurements providing the beam 1 is horizontal. Otherwise, it is necessary to put a constraint on height. In practice, it suffices for the height H to be substantially constant.

It can be shown that when the sensors are rigidly secured to the beam 1, then oscillations of the beam give rise to variation in the sampling pitch which has no practical influence on the spectrum obtained by the direct Fourier transform. When the sensors remain vertical and the angle of tilt of the beam 1 is statistically zero, and when the wavelength $\lambda$ is continuous and of constant amplitude, then the energy of the spectrum remains the same as with a horizontal beam.

FIG. 3 shows apparatus 10 enabling the profile of a pavement to be reconstituted.

The apparatus essentially comprises a carrying vehicle 11, a beam 1 fitted with three equidistant sensors $C_{av}$, $C_{mi}$, and $C_{ar}$, a computer 12, and a device 13 for measuring the distance travelled by the apparatus 10;

The nature of the carrying vehicle 11 is of little consequence except that it must be capable of moving together with the beam 1, the computer 12, and the device 13 for measuring the distance travelled over structures of the kind specified in the introduction, roads or highways, and it must be capable of doing so at speeds that are comparable to the speeds of ordinary users without impeding them or constituting or any particular danger for them. It is entirely possible for this purpose to use a vehicle of the minibus or light van type with special bodywork and provided with the regulation signalling required for dynamic measuring units.

The beam 1 is rigid and connected to the carrying vehicle 11 via a hinge 14 making it possible firstly to remain in a vertical plane parallel to the travel direction of the carrying vehicle 11, and secondly to remain horizontal using a servo-control device. The stiffness of the beam 1 can be obtained either by giving it an appropriate shape, or by using materials that present very high intrinsic stiffness, e.g. carbon/kevlar, or special steels, or else by combining the two above solutions.

In order to ensure that the beam 1 remains in a vertical plane, it is possible to use the force of gravity and a shaft 15 resting on bearings oriented relative to the longitudinal axis of the carrying vehicle 11, together with damping means 16 and a system for compensating centrifugal forces while turning.

The beam 1 can be kept horizontal by an inertial servo-control device or by any other equipment using gravity at the site in question as a reference.

The computer 12 is connected to the sensors $C_{av}$, $C_{mi}$, $C_{ar}$, and to the device 13 for measuring the distance travelled. The sensors operate simultaneously to pick up the height distances between each of them and the pavement at a travel distance pitch which is fixed for a series of measurements so as to enable the computer 12 to reconstitute the profile of the pavement.

The sensors can be of the laser type using a triangulation principle or using a method based on defocusing. It is also possible to envisage high frequency ultrasound, or ordinary precision telemetry devices, that enable resolution of about 10 microns to be obtained.

The computer 12 performs the following functions: acquiring signals coming from the device 13 for measuring the travel distance, acquiring and possibly digitizing the signals from the sensors $C_{av}$, $C_{mi}$, and $C_{ar}$ as a function of the travel distance signals provided by the device 13, and reconstituting the profile of the structure. These functions are performed using a set of appropriate algorithms and programs.

The hardware constituting the computer 12 can be based on commercially available components or on a DSP type processor. The computer power that is strictly necessary is less than that available from a bottom-of-range Pentium II™.

The device 13 for measuring the distance travelled must deliver signals to the computer 12 that enable it to trigger acquisition at a known measurement pitch P. It is possible to use a fifth-wheel type device or a coder mounted on the gear box of the carrying vehicle and associated with suitable electronics. The use of a Doppler effect sensor is not recommended if it is desired to be able to perform measurements at low speeds.

Assuming a sampling pitch P of 2.5 centimeters (cm) and calculating a Fourier transform on the basis of 8192 points, then the distance travelled for this series of measurements is 204.8 meters (m). Assuming that the vehicle carrying the apparatus is travelling at a speed of 20 meters per second (m/s), then there are 10 seconds (s) available for performing the Fourier transform. On a PC compatible fitted with a Pentium 90, the time required to perform both transforms is less than 2 s.

The following tables give results obtained with a simulation program.

The simulation was performed under the following conditions:

L=0.33 m, sampling P=0.1 m;

the road profile was simulated using spectral characteristics analogous to those of a real road and limited to wavelengths lying in the range 0.7 m to 44.8 m;

a single sample of 8192 points was used with weighting by means of a Hanning window;

energy was computed by directly summing the squares of the moduluses of the components of the Fourier transform (without weighting), and only the five most significant figures are given, so energies are not comparable for different wavelength ranges, but only within any one range;

the mean error relative to the profile is equal to the square root of the sum of the squares of the point-to-point errors divided by the number of points;

computations were performed with precision of about 18 significant digits; and four situations were treated: the real profile; the horizontal beam; the purely oscillating beam with vertical sensors; and the oscillating beam with sensors connected to the so-called "real" beam:

|  | LW energy | MW energy | SW energy | Differences |
|---|---|---|---|---|
| "Infinite" measurement precision | | | | |
| Real profile | 12244 | 36406 | 10368 | 0.0002 |
| Horizontal beam | 12314 | 36419 | 10368 | 0.0339 |
| Pure oscillating beam | 12271 | 36483 | 10417 | 0.0396 |
| "Real" beam | 12220 | 36482 | 10409 | 1.0036 |
| Measurement precision 0.002 mm | | | | |
| Real profile | 12244 | 36399 | 10365 | 0.0002 |
| Horizontal beam | 12191 | 36036 | 10268 | 0.3712 |
| Pure oscillating beam | 12155 | 36115 | 10316 | 0.9211 |
| "Real" beam | 12103 | 36118 | 10311 | 1.7437 |
| Measurement precision 0.02 mm | | | | |
| Real profile | 12216 | 36345 | 10335 | 0.0002 |
| Horizontal beam | 11192 | 33046 | 9415 | 4.123 |
| Pure oscillating beam | 11135 | 33176 | 9442 | 3.662 |
| "Real" beam | 11126 | 33288 | 9450 | 3.910 |
| Measurement precision 0.05 mm | | | | |
| Real profile | 12172 | 36241 | 10304 | 0.0004 |
| Horizontal beam | 10235 | 28648 | 8141 | 11.46 |
| Pure oscillating beam | 10227 | 28392 | 8206 | 7.80 |
| "Real" beam | 9807 | 28834 | 8135 | 6.84 |

From an initial analysis of these tables, it can be seen that:

the results obtained with "infinite precision" are entirely compatible with the theoretical approach thus tending to prove the validity of the technique;

if it is desired to perform pure profile measurement, it is appropriate firstly to have measurement precision of at least 0.002 mm, and secondly to operate under conditions in which the beam is horizontal. Technologically, such conditions can be achieved, even though they are expensive; and certain results can appear to be surprising, particularly the errors for precisions of 0.02 mm and 0.05 mm where moving beams give better values than the horizontal beam, and this is doubtless due to the nature of the simulation in which tilt is random and the variations compensate for resolution.

If attention is paid to energy measurements only, it can be seen that the LW (long wave) energy as measured by the beam is very close to the theoretical energy, which can be interpreted as meaning that the length of the beam could be shortened further without affecting its performance, enabling it to move down to the megatexture range.

It should also be observed that although the measured energy levels and the real energy levels appear to be rather different, in terms of smoothness score, i.e. the logarithms of these energy levels, the differences are of percentage order for measurement precision of 0.02 mm, so it would appear that the apparatus is suitable for evaluating smoothness in terms of score using sensors that are commonplace in metrology.

It is clear that these results differ from the reality they are supposed to measure; as mentioned above, the content of the simulated road comprises, by construction, only wavelengths lying in the range 0.7 m to 44.8 m, which is not true of a real road, and it must be accepted that the signal input from the sensors needs to be filtered. Nevertheless, since the beam does not of itself contribute any phase distortion, it is possible to use filters with known phase variation (e.g. linear phase filters) and to correct the signal for phase as well as correcting it for amplitude in order to reconstitute the real profile in the above-specified range of wavelengths. Consideration could also be given to sampling at sufficiently small intervals to ensure that spectrum folding does not disturb measurements in the wavelength bands used.

The method applies to the field of smoothness and megatexture for a vehicle travelling at normal speed. It also applies to the macrotexture and microtexture ranges if the vehicle is travelling at a slow speed.

What is claimed is:

1. A method of reconstituting the profile of a pavement, by moving three contactless distance-measuring sensors over a pavement, the sensors being equidistant and in alignment in the direction of motion, and supplying signals representative of their respective heights above the pavement at a travel distance pitch which is fixed for any one series of measurements, measuring the distance traveled by one of said sensors, and obtaining information representative of the longitudinal profile of the pavement by subtracting twice the height measured by a middle sensor from a sum of the heights measured by two end sensors, the method being characterized by:

causing the sensors to be carried by a rigid beam held permanently horizontal, simultaneously measuring the height of each of the sensors above the pavement at each travel distance pitch independent of the distance between the sensors, and applying mathematical processing to the information representative of the longitudinal profile of the pavement by using direct and inverse Fourier transforms to deduce therefrom the longitudinal profile of the pavement.

2. A method according to claim 1, characterized by the fact that the travel distance pitch is modifiable.

3. Apparatus for implementing the method according to claim 1 or claim 2, characterized by the fact that it comprises:

a carrier vehicle suitable for being moved over the pavement;

a beam mounted on said carrier vehicle in such a manner as to be maintained permanently horizontal, regardless of the slope of the pavement on which said carrier vehicle is traveling, three contactless distance-measuring sensors are mounted equidistantly and in alignment on said beam, the sensors being suitable for delivering signals representative of their respective heights above the pavement;

a device for measuring the distance traveled by the carrier vehicle; and a computer receiving signals from the device for measuring travel distance and from the distance-measuring sensors, said computer triggering simultaneous acquisitions by the contactless distance-measuring sensors at a known measurement pitch independent of the distance between the sensors, and performing mathematical processing on the results of said height measurements so as to obtain the profile of the pavement.

* * * * *